United States Patent
Kato et al.

(10) Patent No.: US 9,469,004 B2
(45) Date of Patent: *Oct. 18, 2016

(54) ROTATION PROCESSING MACHINE AND ROTATION PROCESSING METHOD

(71) Applicant: AISIN AW CO., LTD., Anjo-shi, Aichi-ken (JP)

(72) Inventors: Susumu Kato, Anjo (JP); Akira Takagai, Anjo (JP); Masahiro Otani, Anjo (JP); Akitomo Kawanishi, Anjo (JP)

(73) Assignee: AISIN AW CO., LTD., Aichi-ken (JP)

( * ) Notice: Subject to any disclaimer, the term of this patent is extended or adjusted under 35 U.S.C. 154(b) by 713 days.

This patent is subject to a terminal disclaimer.

(21) Appl. No.: 13/772,912

(22) Filed: Feb. 21, 2013

(65) Prior Publication Data

US 2013/0225379 A1    Aug. 29, 2013

(30) Foreign Application Priority Data

Feb. 24, 2012 (JP) .................. 2012-038720
Mar. 30, 2012 (JP) .................. 2012-078817
Jul. 20, 2012 (JP) .................. 2012-161619

(51) Int. Cl.
   B23Q 3/157      (2006.01)
   B23F 23/04      (2006.01)
   (Continued)

(52) U.S. Cl.
   CPC ............... B23Q 5/34 (2013.01); B23F 19/10 (2013.01); B23F 19/102 (2013.01); B23F 23/04 (2013.01);
   (Continued)

(58) Field of Classification Search
   CPC .......... Y10T 409/100795; Y10T 409/100954; Y10T 483/16; Y10T 409/101113; B23Q 7/046; B23Q 7/10; B23F 23/04; B23F 23/02; B23F 19/102
   USPC ...................................... 483/14; 409/6–7, 8
   See application file for complete search history.

(56) References Cited

U.S. PATENT DOCUMENTS 4,457,659 A * 7/1984 Watanabe ............... B23F 23/04
                                                    414/223.01
5,213,559 A   5/1993 Lunazzi
(Continued)

FOREIGN PATENT DOCUMENTS

GB    889132 A  *  7/1962
JP    37-5992 Y1    4/1962
(Continued)

OTHER PUBLICATIONS

Machine Translation of JP 2005-262354.
(Continued)

*Primary Examiner* — Erica E Cadugan
(74) *Attorney, Agent, or Firm* — Sughrue Mion, PLLC

(57) ABSTRACT

A rotation processing machine, including a rotating device that holds and rotates a workpiece; a processing device on which a cutting tool is mounted to process the workpiece; and a turning loader that has grippers arranged about a turning central axis, and that turns so that the grippers sequentially face the rotating device. The turning loader is configured to deliver and receive the workpiece to and from the rotating device by turning with the workpiece being directly or indirectly held by the gripper, and to deliver and receive the cutting tool to and from the processing device by turning with the cutting tool being directly or indirectly held by the gripper.

17 Claims, 14 Drawing Sheets

(51) Int. Cl.
　　　B23F 23/06　　　(2006.01)
　　　B23F 5/20　　　(2006.01)
　　　B23F 19/10　　　(2006.01)
　　　B23Q 1/48　　　(2006.01)
　　　B23Q 5/34　　　(2006.01)
　　　B23F 23/12　　　(2006.01)
　　　B23Q 7/10　　　(2006.01)
　　　B23F 5/22　　　(2006.01)
　　　B23Q 7/04　　　(2006.01)

(52) U.S. Cl.
　　　CPC ........... *B23F 23/06* (2013.01); *B23F 23/1293* (2013.01); *B23Q 1/4842* (2013.01); *B23Q 3/157* (2013.01); *B23Q 7/046* (2013.01); *B23Q 7/10* (2013.01); *B23F 5/22* (2013.01); *B23Q 1/489* (2013.01); *B23Q 7/04* (2013.01); *Y10T 409/10159* (2015.01); *Y10T 409/100954* (2015.01); *Y10T 409/101113* (2015.01); *Y10T 409/103657* (2015.01); *Y10T 409/109699* (2015.01); *Y10T 483/10* (2015.01); *Y10T 483/16* (2015.01); *Y10T 483/1736* (2015.01); *Y10T 483/1745* (2015.01)

(56) References Cited

U.S. PATENT DOCUMENTS

| 5,228,814 | A | 7/1993 | Suwijn |
| 5,904,457 | A | 5/1999 | Suwijn et al. |
| 7,108,647 | B2 * | 9/2006 | Nakazawa ............... B23Q 1/66 29/33 P |
| 8,506,358 | B2 | 8/2013 | Amarell et al. |
| 2013/0223945 | A1 | 8/2013 | Kato et al. |

FOREIGN PATENT DOCUMENTS

| JP | 57-201124 A | 12/1982 |
| JP | 62-255012 A | 11/1987 |
| JP | 63-102857 A | 5/1988 |
| JP | 0187828 U | 6/1989 |
| JP | 6-22782 B2 | 3/1994 |
| JP | 11-291125 A | 10/1999 |
| JP | 2002-066861 A | 3/2002 |
| JP | 2002-233922 A | 8/2002 |
| JP | 2005-238358 A | 9/2005 |
| JP | 2005262354 A | 9/2005 |
| JP | 2011079127 A | 4/2011 |
| JP | 2013-226637 A | 11/2013 |
| JP | 2013226636 A | 11/2013 |
| JP | 2013226638 A | 11/2013 |
| JP | 2014061591 A | 4/2014 |

OTHER PUBLICATIONS

Communication from United States Patent and Trademark Office issued Sep. 22, 2015 in U.S. Appl. No. 13/774,481.
International Search Report for corresponding International Patent Application No. PCT/JP2013/054085 mailed Mar. 19, 2013.
International Search Report for related family International Patent Application No. PCT/JP2013/054084 mailed Mar. 19, 2013.

* cited by examiner

F I G . 1
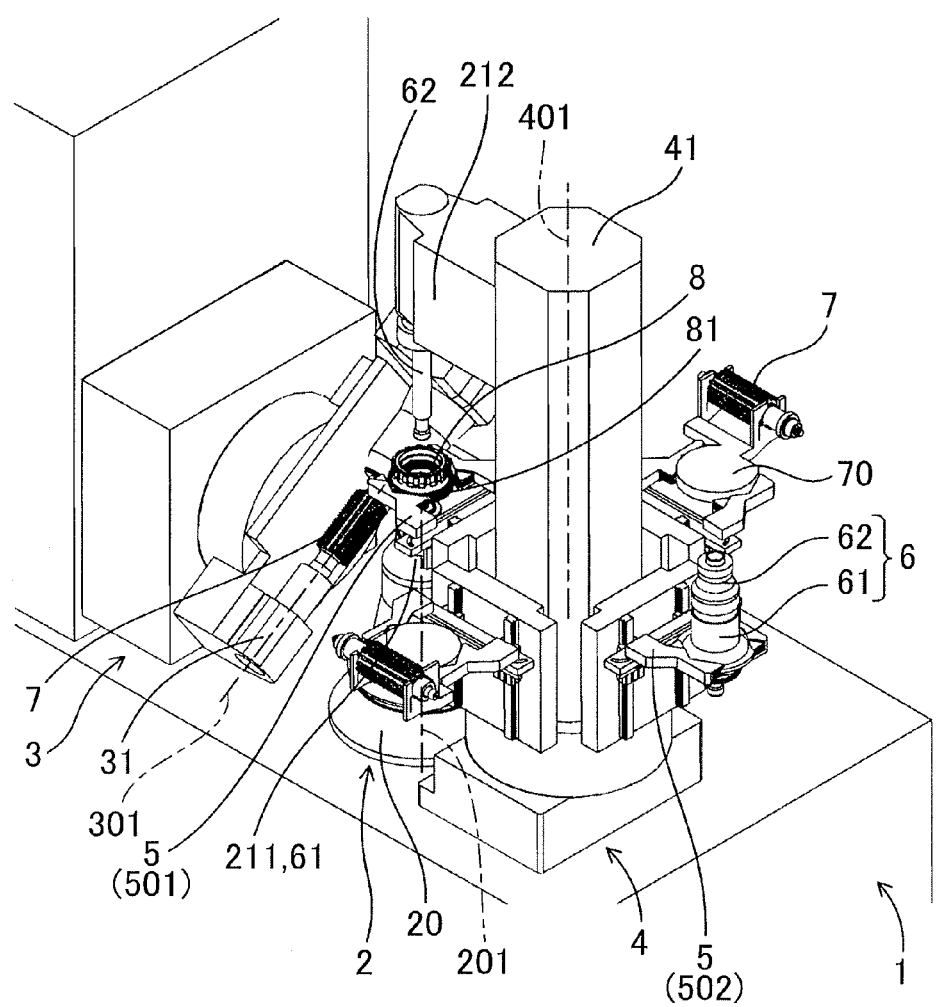

ROTATION PROCESSING MACHINE AND ROTATION PROCESSING METHOD

The disclosures of Japanese Patent Application Nos. 2012-078817, 2012-038720, and 2012-161619 filed on Mar. 30, 2012, Feb. 24, 2012, and Jul. 20, 2012, respectively, including the specifications, drawings and abstracts are incorporated herein by reference in its entirety.

BACKGROUND OF THE INVENTION

The present invention relates to rotation processing machines and rotation processing methods capable of performing changeover of a workpiece and a cutting tool that is used to process the workpiece, by using a turning loader.

DESCRIPTION OF THE RELATED ART

When processing a workpiece with a cutting tool in processing devices, transfer of the workpiece and changeover of the cutting tool are performed by using separate devices. Specifically, the workpiece is set at a specific processing position by using a robot, a transfer loader, etc., and is processed by using the cutting tool. After a required number of workpieces are processed, changeover of the cutting tool is performed according to the kind of workpiece to be processed. This changeover is performed by using a robot or a dedicated changeover device.

For example, the workpiece setup method of Japanese Patent Application Publication No. 2002-233922 (JP 2002-233922 A) uses a machine tool including processing tool stands each having cutting means and capable of reciprocating, and a table provided thereon with workpiece stands on which a workpiece is placed. The workpiece stands are moved by relatively moving the processing tool stands and the table.

For example, the processing cell system of Japanese Examined Patent Application Publication No. H06-22782 (JP H06-22782 B) has an automatic processing machine that processes a workpiece, and a setup station that sets up a jig or tool required to process the workpiece. The workpiece for processing and the jig or tool for processing setup are supplied to the automatic processing machine by a robot. The jig or tool, the workpiece, and a storage medium storing information such as setup information can be transferred and moved in a set in any process between the automatic processing machine and the setup station by transfer means.

For example, in Japanese Patent Application Publication No. H11-291125 (JP H11-291125 A) regarding a hobbing machine discloses that a loader is turned to repeatedly carry unprocessed and processed workpieces in and out to and from a table that rotates the workpiece.

SUMMARY OF THE INVENTION

However, using the robot or the dedicated changeover device to perform changeover of a cutting tool that is used to process a workpiece increases overall initial investment in the processing device. Moreover, there are many interfering members during changeover of the cutting tool, which increases the time required for changeover.

The present invention was developed in view of the above conventional problems, and it is an object of the present invention to provide a rotation processing machine and a rotation processing method in which a workpiece and a cutting tool can be delivered and received by using the same turning loader, and which can reduce the time required for changeover of the cutting tool.

According to one aspect of the present invention, a rotation processing machine includes: a rotating device that holds a workpiece and rotates; a processing device on which a cutting tool is mounted to process the workpiece; and a turning loader that has a plurality of grippers arranged about a turning central axis, and that turns so that the plurality of grippers sequentially face the rotating device. In the rotation processing machine, the turning loader is configured to deliver and receive the workpiece to and from the rotating device by turning with the workpiece being directly or indirectly held by the gripper, and to deliver and receive the cutting tool to and from the processing device by turning with the cutting tool being directly or indirectly held by the gripper.

According to another aspect of the present invention, a rotation processing method includes: using a rotating device that holds a workpiece and rotates, a processing device on which a cutting tool is mounted to process the workpiece, and a turning loader that has a plurality of grippers arranged about a turning central axis, and that turns so that the plurality of grippers sequentially face the rotating device; and delivering and receiving the workpiece to and from the rotating device by turning the turning loader with the workpiece being directly or indirectly held by the gripper, and delivering and receiving the cutting tool to and from the processing device by turning the turning loader with the cutting tool being directly or indirectly held by the gripper.

In the above rotation processing machine, the time required for changeover of the cutting tool is reduced in the case where a different kind of cutting tool is used according to the kind of workpiece to be processed.

In the rotation processing machine, the turning loader having the plurality of grippers are designed so that delivery and reception of the workpiece to and from the rotating device and delivery and reception of the cutting tool to and from the processing device can be performed in a short time.

When processing a workpiece, a cutting tool corresponding to the kind of workpiece is held by the gripper, and the turning loader is turned so that this cutting tool faces the processing device. Then, the cutting tool held by the gripper is mounted onto a cutting-tool mounting portion of the processing device. A workpiece before processing is held by the gripper, and the turning loader is turned so that this workpiece faces the rotating device. Thereafter, the workpiece held by the gripper is mounted onto (carried in) a workpiece support portion of the rotating device. The workpiece that is rotated by the rotating device is processed by the cutting tool in the processing device. Then, the processed workpiece in the rotating device is held by the gripper, and the turning loader is turned to carry the processed workpiece out. Subsequently, the operation of carrying the workpiece in, processing the workpiece, and carrying the workpiece out is repeated according to the number of workpieces to be processed.

Thereafter, if changeover of the cutting tool is needed according to the kind of workpiece to be processed, the cutting tool on the cutting-tool mounting portion of the processing device is held by the gripper, and the turning loader is turned to carry this cutting tool out. Then, another cutting tool is held by the gripper, and the turning loader is turned so that this cutting tool faces the processing device. This cutting tool is mounted onto the cutting-tool mounting portion of the processing device. Subsequently, the operation of carrying the workpiece in, processing the workpiece, and carrying the workpiece out by each gripper is repeated according to the number of workpieces to be processed, in a manner similar to that described above.

The gripper may directly hold the workpiece and the cutting tool, or may indirectly hold at least one of the workpiece and the cutting tool via a pallet etc.

As described above, according to the above rotation processing machine, the workpiece and the cutting tool can be delivered and received by using the same turning loader. This can reduce the time required for changeover of the cutting tool.

According to the above rotation processing method, as in the case of the above rotation processing machine, the workpiece and the cutting tool can be delivered and received by using the same turning loader. This can reduce the time required for changeover of the cutting tool.

BRIEF DESCRIPTION OF THE DRAWINGS

FIG. 1 is a perspective view showing a rotation processing machine according to a first embodiment;

DETAILED DESCRIPTION OF THE EMBODIMENTS

Figure 2:
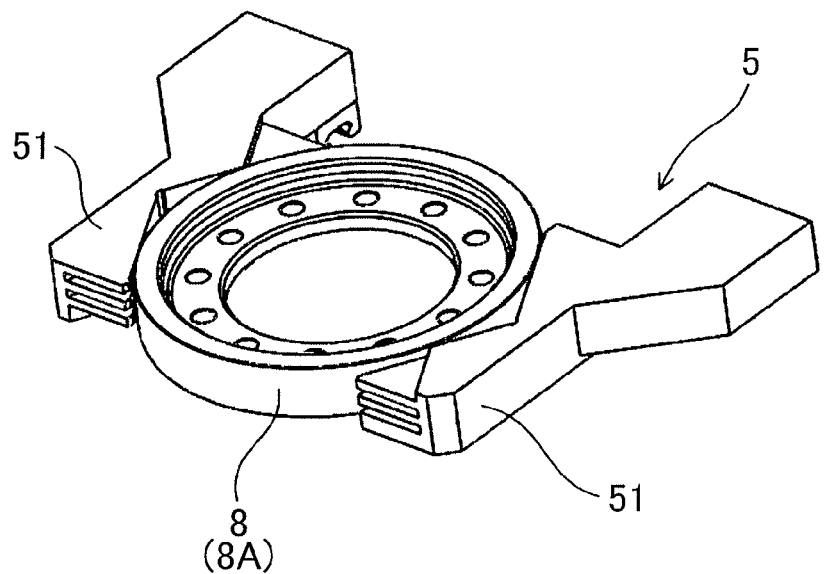
FIG. 2 is a perspective view showing a workpiece held by a gripper according to the first embodiment.

Preferred embodiments of the rotation processing machine and the rotation processing method of the present invention described above will be described.

In the above rotation processing machine, the workpiece may have a cylindrical shape, and the processing device may be configured so that both ends of the cutting tool are mounted on a cutting-tool mounting portion of the processing device, and may be configured to rotate the cutting tool on the cutting-tool mounting portion to form a tooth surface on an outer periphery of the workpiece rotated by the rotating device.

In this case, the rotating device and the processing device form a hobbing machine, and changeover of a hob serving as the cutting tool in the hobbing machine can be performed in a short time.

The processing device can rotate the cutting tool on the cutting-tool mounting portion with a rotation central axis of the cutting-tool mounting portion extending in a horizontal direction or being tilted with respect to the horizontal direction. Products that are produced by processing in the hobbing machine formed by the rotating device and the processing device can be used as gears such as a spur gear, a helical gear, and a worm gear. The workpiece that is held by the rotating device may be a part having a circular cross section and having an outer peripheral surface on which a tooth surface is formed.

Each of the plurality of grippers may be placed at the same radial distance from the turning central axis, and may be able to directly or indirectly hold any of the workpiece and the cutting tool.

In this case, the plurality of grippers may have the same configuration, and the workpiece and the cutting tool can be held by any of the grippers. This allows delivery and reception of the workpiece and delivery and reception of the cutting tool to be efficiently performed.

The rotating device may be configured to rotate about a rotation central axis extending in a vertical direction, the turning loader may be configured to turn each of the plurality of grippers in the horizontal direction with the turning central axis extending in the vertical direction, and each of the plurality of grippers of the turning loader, the rotating device, and the processing device may be capable of relatively moving in the vertical direction, and may be configured to make the relative movement to deliver and receive the workpiece between the turning loader and the rotating device and to deliver and receive the cutting tool between the turning loader and the processing device.

In this case, delivery and reception of the workpiece and delivery and reception of the cutting tool can be stably performed.

The cutting tool may be configured to be held by a pallet, the pallet may have a base portion that is held by the gripper, and a cutting-tool holding portion that is formed at a position offset from a center of the base portion and that holds the cutting tool, and the processing device may be configured so that the cutting-tool mounting portion is advanced, and so that the cutting tool on the cutting-tool holding portion of the pallet held by the gripper is mounted on the cutting-tool mounting portion that has been advanced.

In this case, using the pallet allows delivery and reception of the cutting tool between each gripper and the processing device to be easily performed in a short time.

The rotating device may be configured to support the workpiece via a rotation support jig mounted on a workpiece support portion of the rotating device, and the turning loader may be configured to deliver and receive the rotation support jig to and from the rotating device by turning with the rotation support jig being directly or indirectly held by the gripper.

In this case, replacement of the rotation support jig is needed according to the kind of workpiece, and changeover of the cutting tool and the rotation support jig can be performed in a short time.

The rotation support jig may be formed by one jig portion that is mounted on one rotating spindle of the rotating device, and the other jig portion that is mounted on the other rotating spindle placed coaxially with the one rotating spindle in the rotating device, and the turning loader may be configured to allow the gripper to hold the rotation support jig having the one jig portion combined with the other jig portion.

In this case, the rotating device rotates the workpiece held between the one jig portion on the one rotating spindle and the other jig portion on the other rotating spindle, and the processing device can stably process the workpiece.

The turning loader allows the gripper to hold the rotation support jig formed by the one jig portion and the other jig portion, and can move this rotation support jig between an external delivery/reception position and an internal delivery/reception position.

A deburring tool may be rotatably attached to the rotation support jig, and the deburring tool may be configured to remove burrs generated in the workpiece when the workpiece is processed by the processing device.

In this case, replacement of the rotation support jig and the deburring tool is needed according to the kind of workpiece, and changeover of the deburring tool can be performed when performing changeover of the rotation support jig.

In the above rotation processing method, the rotating device may be configured to support the workpiece via a rotation support jig mounted on a workpiece support portion of the rotating device, and the rotation support jig may be delivered and received to and from the rotating device by turning the turning loader with the rotation support jig being directly or indirectly held by the gripper.

In this case, replacement of the rotation support jig is needed according to the kind of workpiece, and changeover of the cutting tool and the rotation support jig can be performed in a short time.

EMBODIMENTS

Embodiments of the rotation processing machine and the rotation processing method will be described below with reference to the accompanying drawings.

First Embodiment

As shown in FIG. 1, a rotation processing machine 1 of the present embodiment includes a rotating device 2 that holds a workpiece 8 and rotates, a processing device 3 on which a cutting tool 7 is mounted to process the workpiece 8, and a turning loader 4 around which a plurality of grippers 5 are arranged at the same radial distance from a turning central axis 401 and which turns so that each gripper 5 sequentially faces the rotating device 2.

Each gripper 5 is capable of directly or indirectly holding both the workpiece 8 and the cutting tool 7, and is configured to deliver and receive the workpiece 8 to and from the rotating device 2 and to deliver and receive the cutting tool 7 to and from the processing device 3.

The rotation processing machine 1 and the rotation processing method of the present embodiment will be described in detail with reference to FIGS. 1 to 10.

As shown in FIG. 1, the processing device 3 and the rotating device 2 of the present embodiment form a hobbing machine that form tooth surfaces 81 on the outer periphery of the workpiece 8 with a hob as the cutting tool 7. The rotation processing machine 1 of the present embodiment is capable of transferring the workpiece 8 to the hobbing machine and performing changeover (replacement) of the cutting tool 7 on the hobbing machine. The processing device 3 and the rotating device 2 of the present embodiment cut teeth into the workpiece 8 with a circular cross section to produce a helical gear as a product.

Figure 3:
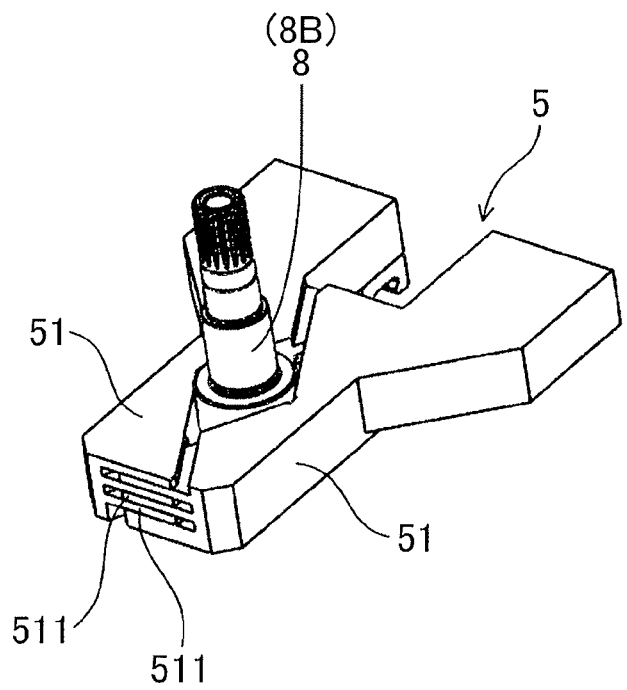
FIG. 3 is a perspective view showing another workpiece held by the gripper according to the first embodiment.

As shown in FIGS. 2 and 3, the workpiece 8 of the present embodiment has a disc shape for gears, and the gripper 5 is configured to hold the outer periphery of the workpiece 8 having a disc shape. The gripper 5 is capable of holding a plurality of kinds of workpieces 8 with different outer diameters by varying the interval between a pair of gripping portions 51. FIG. 2 shows a workpiece 8A that is used to form a gear with a large outer diameter, and FIG. 3 shows a workpiece 8B that is used to form a gear with a small outer diameter.

Engaging portions 511 that overlap one another in the vertical direction to engage with each other when holding the workpiece 8B with the small outer diameter are formed in the pair of gripping portions 51 of the gripper 5. The gripper 5 of the present embodiment is configured to move toward and away from each other the pair of gripping portions 51 that hold the workpiece 8, a rotation support jig 6, or a pallet 70 therebetween from both sides in the horizontal direction.

As shown in FIG. 1, the processing device 3 is configured such that a rotation central axis 301 of a cutting-tool mounting portion 31 (hob spindle) on which the cutting tool 7 is mounted is tilted with respect to the horizontal direction. The rotating device 2 is configured to rotate about a rotation central axis 201 extending in the vertical direction. The processing device 3 rotates the cutting tool 7 to form the tooth surfaces 81 in a helical pattern on the outer periphery of the workpiece 8 rotated by the rotating device 2.

The processing device 3 is capable of rotating the cutting-tool mounting portion 31, and is configured to move the cutting-tool mounting portion 31 forward and backward and up and down. The cutting-tool mounting portion 31 is configured to hold shaft portions at both ends of the cutting tool 7. The processing device 3 is placed on the extension of a line connecting the rotating device 2 and the turning loader 4 such that the rotating device 2 is interposed between the processing device 3 and the turning loader 4.

As shown in FIG. 1, a workpiece support portion 21 of the rotating device 2 is formed by a lower support portion 211 that supports the workpiece 8 from below, and an upper support portion 212 that supports the workpiece 8 from above. The lower support portion 211 is attached to the upper end of a rotating table 20, and the upper support portion 212 is attached to a turning central support column 41 of the turning loader 4.

The rotating device 2 is configured to support the workpiece 8 via the rotation support jig 6 mounted on the workpiece support portion 21. The rotating device 2 is placed at a position interposed between the processing device 3 and the turning loader 4, and is configured to support the workpiece 8 from both sides and to rotate about the rotation central axis 201 parallel to the turning central axis 401 of the turning loader 4.

Figure 4:
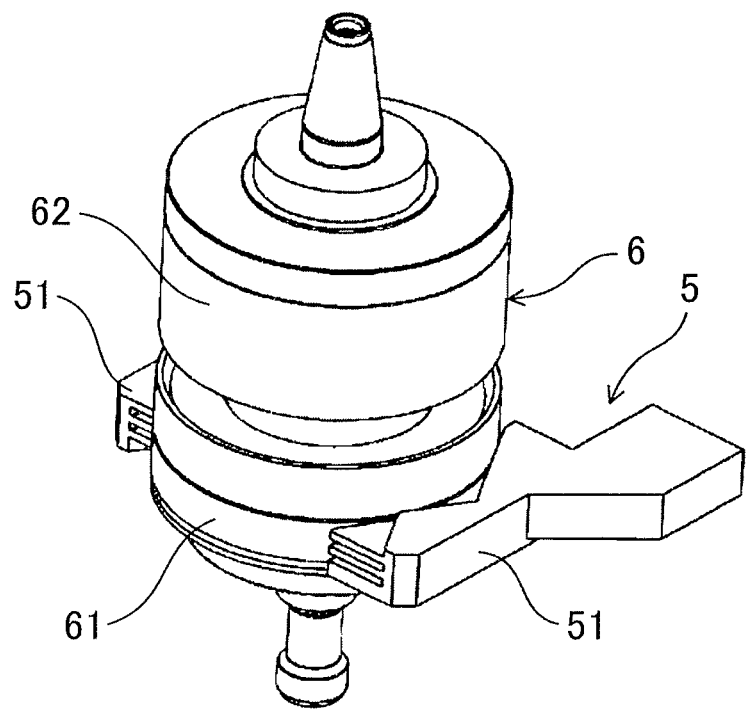
FIG. 4 is a perspective view showing a rotation support jig held by the gripper according to the first embodiment.

As shown in FIG. 4, the rotation support jig 6 is divided into a lower jig portion 61 that is mounted on the lower support portion 211, and an upper jig portion 62 that is mounted on the upper support portion 212, so as to hold the workpiece 8 therebetween from above and below. The workpiece 8 is supported by the rotating device 2 such that the axial direction of the workpiece 8 extends in the vertical direction.

FIG. 4 shows the state where the rotation support jig 6 with the lower jig portion 61 directly overlapping the upper jig portion 62 is held by the gripper 5.

Figure 5:
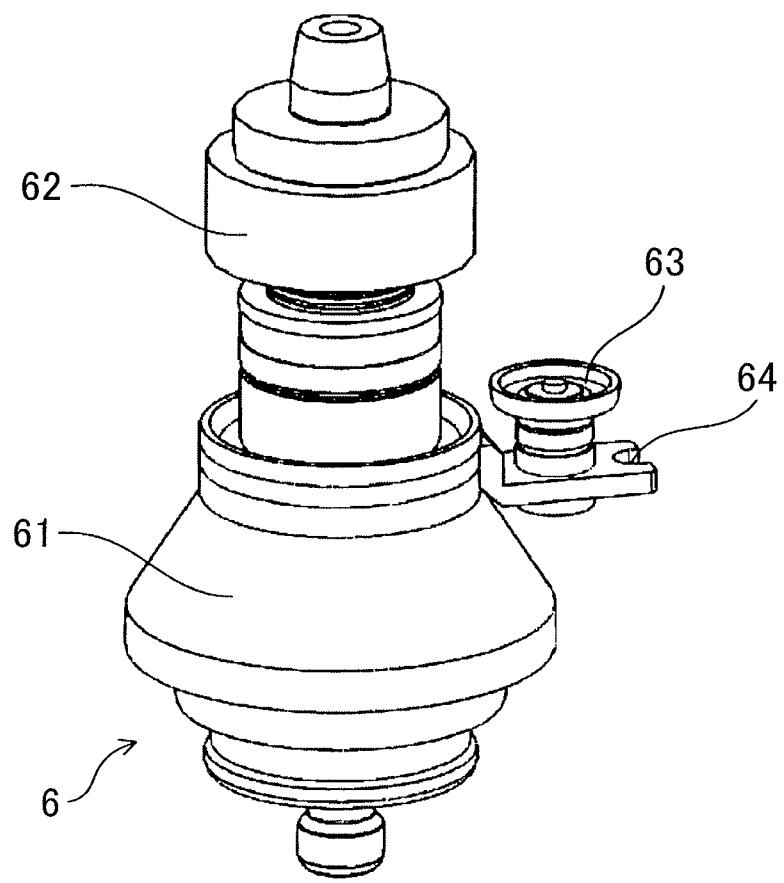
FIG. 5 is a perspective view showing another rotation support jig held by the gripper according to the first embodiment.

As shown in FIG. 5, a deburring tool 63 can be attached to the lower jig portion 61. The deburring tool 63 is supported by the lower jig portion 61 so that the deburring tool 63 can revolve about a rotation central axis of the lower jig portion 61. The deburring tool 63 is supported by the lower jig portion 61 so that the deburring tool 63 can rotate about a rotation central axis parallel to the rotation central axis 201 of the rotating device 2. Moreover, the deburring tool 63 is provided with a stopper groove 64 that engages with a rod 65 placed (standing) on a mount of the rotation processing machine 1. When the lower jig portion 61 is mounted on the lower support portion 211, the stopper groove 64 engages with the rod 65 so that the deburring tool 63 does not revolve about the rotation central axis of the lower jig portion 61.

Figure 6:
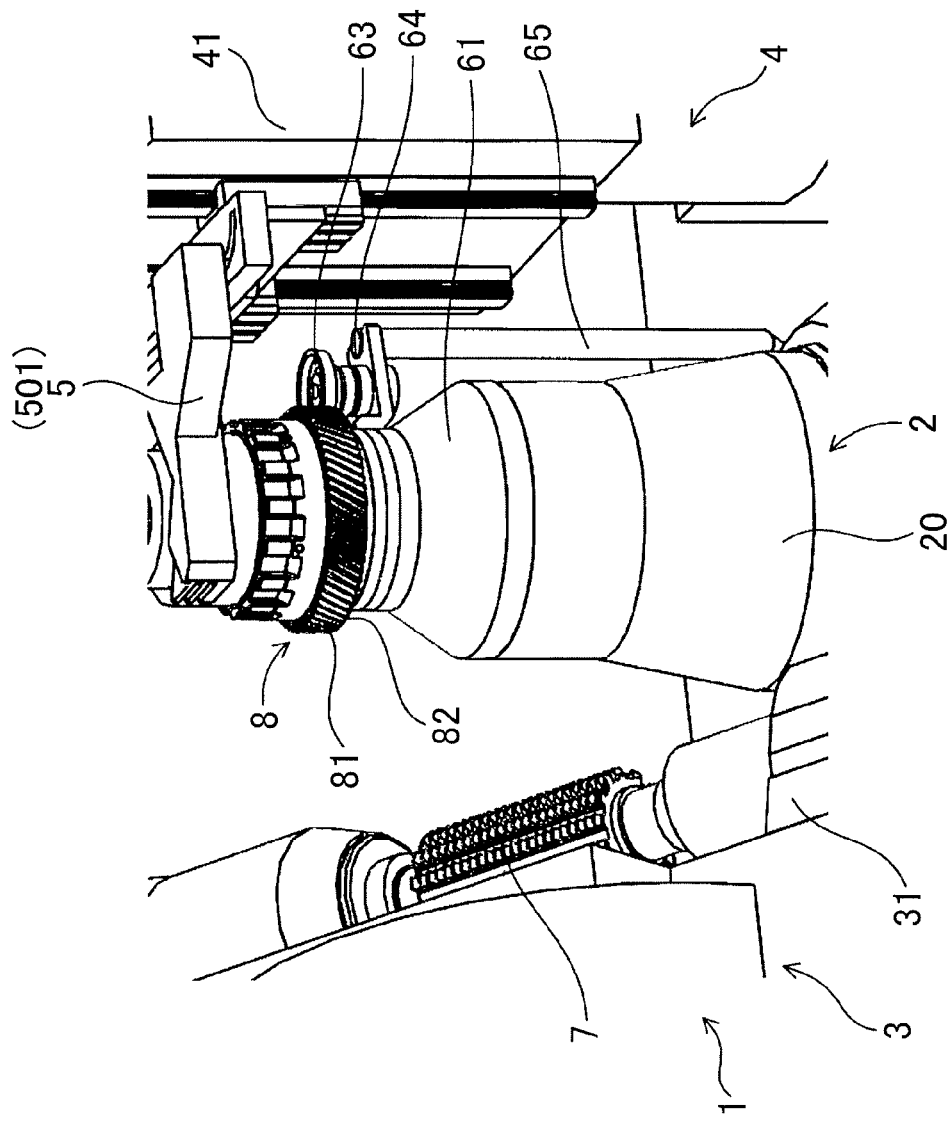
FIG. 6 is a perspective view showing the case where burrs formed on a workpiece are removed by a deburring tool according to the first embodiment.

In this case, as shown in FIG. 6, the deburring tool 63 can remove burrs 82 formed in the lower part of the workpiece 8 in the axial direction (a plurality of projections formed at the end that has been cut) when cutting teeth into the outer periphery of the workpiece 8 with the cutting tool 7 from above in the axial direction. The deburring tool 63 removes the burrs 82 while rotating in response to rotation of the workpiece 8. The deburring tool 63 may be attached to the upper jig portion 62.

Figure 7:
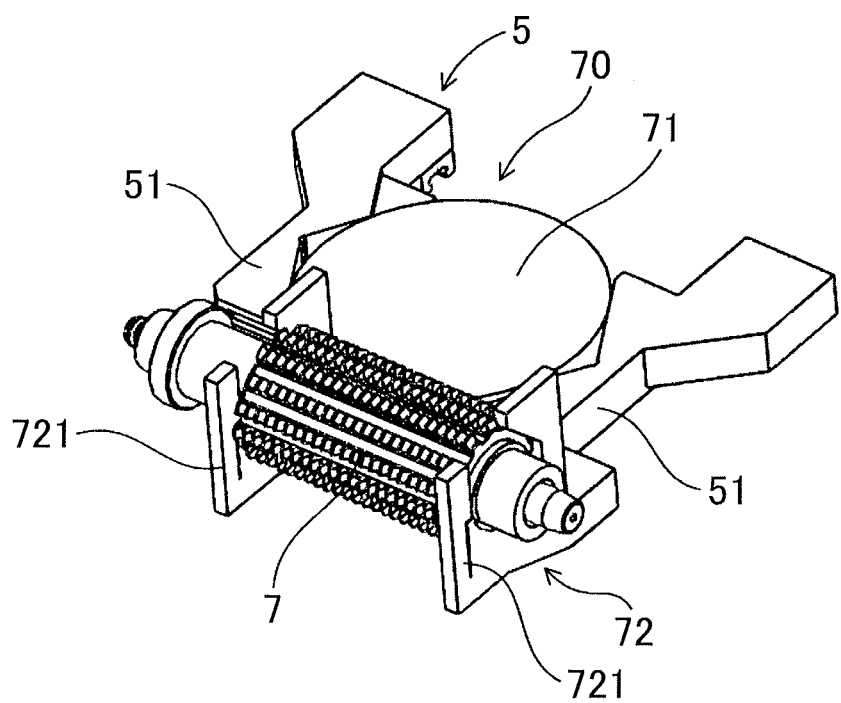
FIG. 7 is a perspective view showing a pallet holding a cutting tool and held by the gripper according to the first embodiment.

As shown in FIG. 7, the cutting tool 7 of the present embodiment is held on the pallet 70 that is held by each gripper 5 of the turning loader 4. The pallet 70 has a base portion 71 that is held by the gripper 5, and a cutting-tool holding portion 72 that is formed at a position offset from the center of the base portion 71 and that holds the cutting tool 7. The base portion 71 is formed in a disc shape so that each gripper 5 can easily hold the base portion 71. The cutting-tool holding portion 72 is configured so that a pair of receiving portions 721 receive the shaft portions at both ends of the cutting tool 7 placed such that its axis extends in the horizontal direction. With the pallet 70 being held by the gripper 5, the cutting-tool holding portion 72 of the pallet 70 is located outward of the turning radius of the gripper 5.

The processing device 3 is configured to advance the cutting-tool mounting portion 31 and move the cutting-tool mounting portion 31 up and down so that the cutting tool 7 in the cutting-tool holding portion 72 of the pallet 70 held by the gripper 5 is mounted on the cutting-tool mounting portion 31.

As shown in FIG. 1, the turning loader 4 of the present embodiment is formed by turnably arranging the plurality of grippers 5 around the turning central support column 41. The turning central axis 401 of the turning central support column 41 extends in the vertical direction, and each gripper 5 is configured to turn about the turning central support column 41 in the horizontal direction.

The plurality of grippers 5 are configured to hold the workpiece 8, the cutting tool 7, and the rotation support jig 6 from a direction perpendicular to the turning central axis 401 of the turning loader 4 and the rotation central axis 201 of the rotating device 2, and to pass between the lower support portion 211 (one rotating spindle 21 described below) and the upper support portion 212 (the other rotating spindle 22) of the rotating device 2.

The gripper 5 of the present embodiment is provided at four positions shifted by 90° from each other on the outer periphery of the turning central support column 41. Each gripper 5 can be individually moved up and down with respect to the turning central support column 41. The gripper 5 may be provided at regular intervals at two or three positions or five or more positions around the turning central support column 41.

The turning loader 4 of the present embodiment is configured to carry any of the workpiece 8, the rotation support jig 6, and the pallet 70 holding the cutting tool 7 in and out. Each gripper 5 is configured to sequentially turn to a delivery/reception position 501 to face the rotating device 2, and to a carry-in/out position 502 located on the opposite side of the turning central support column 41 from the rotating device 2.

Each gripper 5 of the present embodiment is configured to supply a workpiece 8 before processing to the rotating device 2 and take out a processed workpiece 8 from the rotating device 2, to supply and take out the rotation support jig 6 to and from the rotating device 2, and to supply and take out the cutting tool 7 to and from the processing device 3.

Although not shown in the figures, a transfer device capable of transferring any of the workpiece 8, the rotation support jig 6, and the pallet 70 is placed on the opposite side of the turning loader 4 from the rotating device 2.

The transfer device can be placed in various manners with respect to the turning loader 4. For example, the workpiece 8, the rotation support jig 6, and the pallet 70 may be carried in and out by the same transfer device, or may be carried in and out by different transfer devices. The transfer device may be placed at a plurality of positions around the turning central support column 41 about which the grippers 5 turn.

Operation of the rotation processing machine 1 and the rotation processing method of the present embodiment will be described below.

Figure 8:
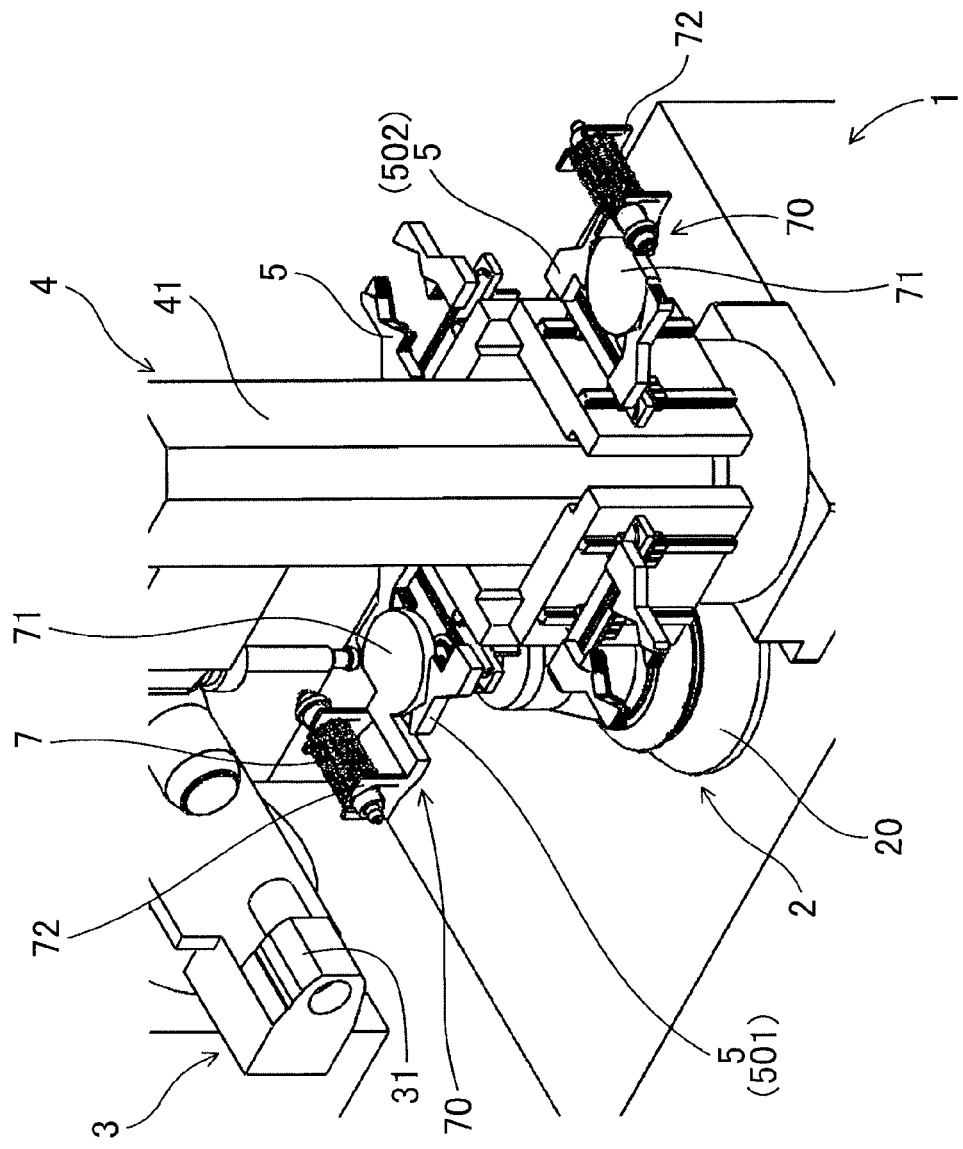
FIG. 8 is a perspective view showing the rotation processing machine in which the cutting tool is to be mounted on a cutting-tool mounting portion of a processing device according to the first embodiment.

As shown in FIG. 8, when processing the workpiece 8, the gripper 5 located at the carry-in/out position 502 holds the pallet 70 holding the cutting tool 7 corresponding to the kind of workpiece 8. At this time, the gripper 5 holds the base portion 71 of the pallet 70 with the side on which the cutting-tool holding portion 72 and the cutting tool 7 are located being located on the front side (the side farther away from the turning central support column 41).

Figure 9:
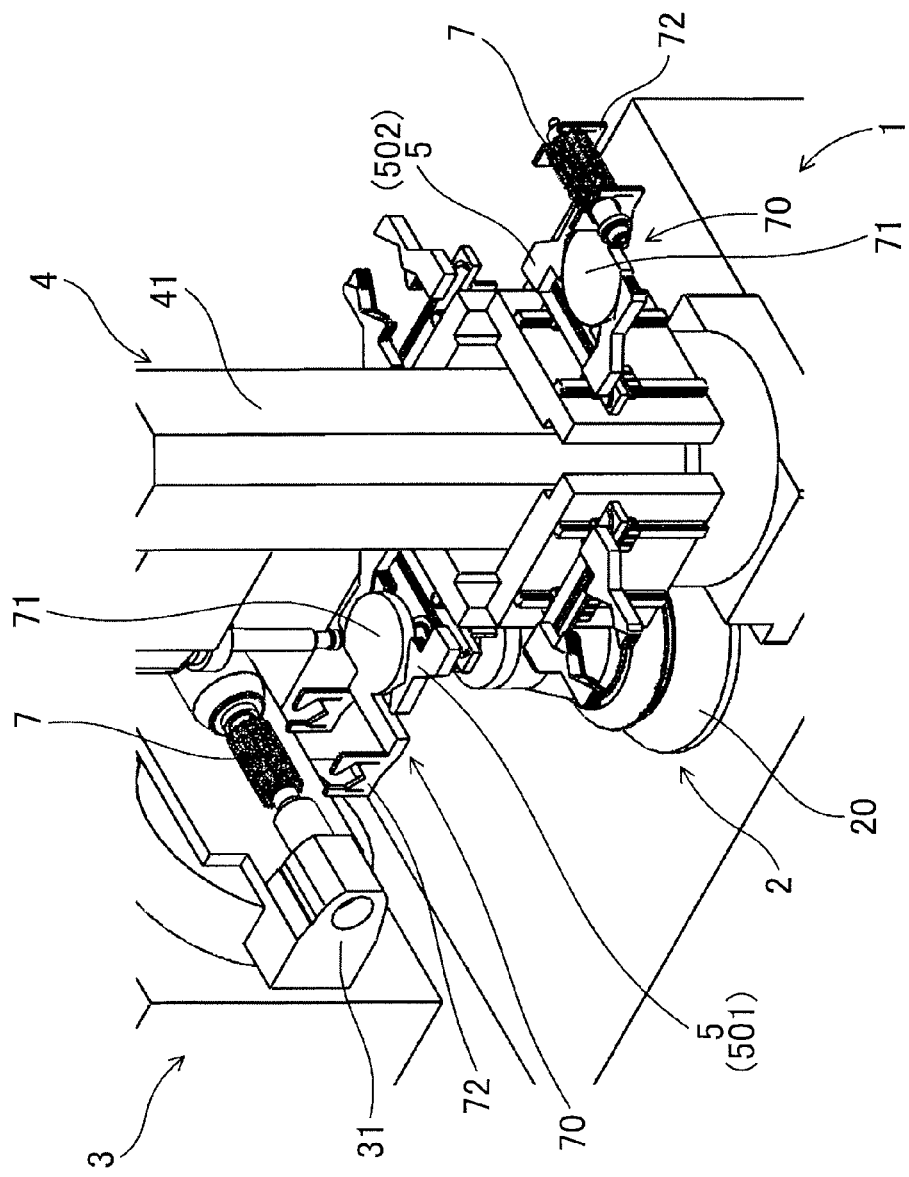
FIG. 9 is a perspective view showing the rotation processing machine in which the cutting tool has been mounted on the cutting-tool mounting portion of the processing device according to the first embodiment.

The turning loader 4 is turned to move the gripper 5 holding the pallet 70 with the cutting tool 7 held thereon to the delivery/reception position 501. Then, as shown in FIG. 9, with the rotation central axis 301 of the cutting-tool mounting portion 31 of the processing device 3 extending in the horizontal direction, the cutting-tool mounting portion 31 is advanced and is moved up, down, right, or left and the cutting tool 7 held by the pallet 70 is mounted onto the cutting-tool mounting portion 31.

Figure 10:
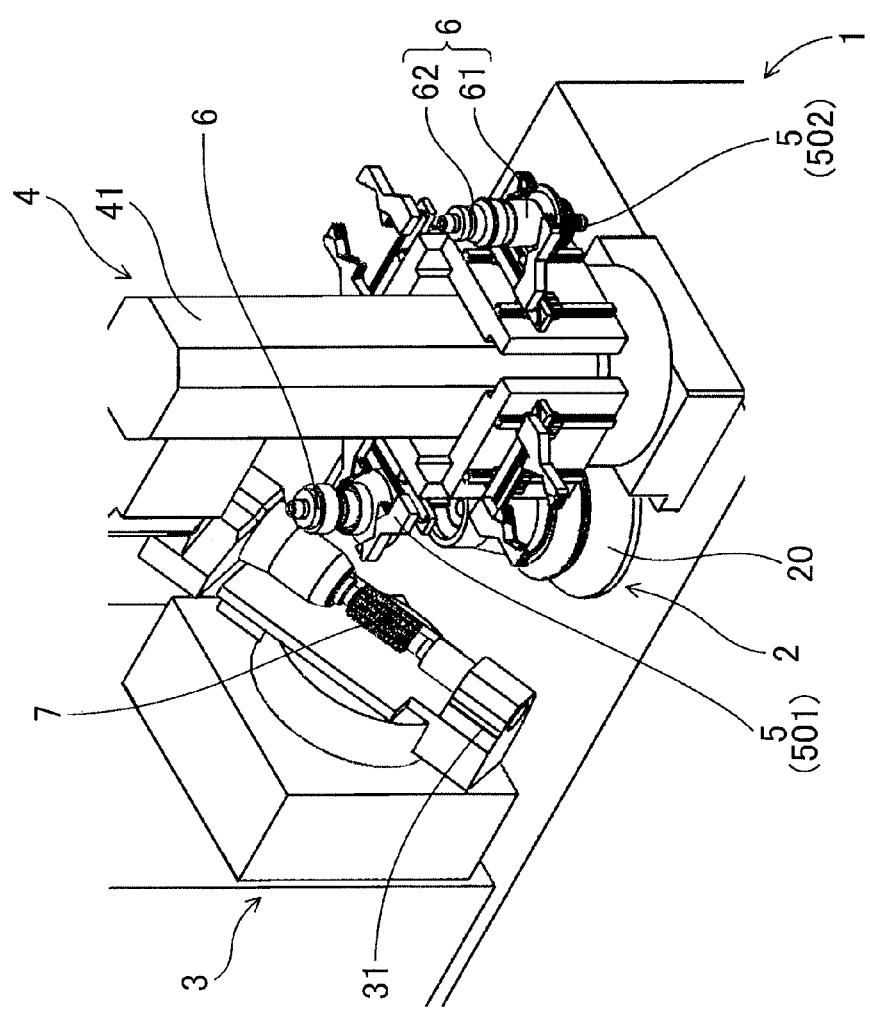
FIG. 10 is a perspective view showing the rotation processing machine in which the rotation support jig is to be mounted on a workpiece support portion of a rotating device according to the first embodiment.

As shown in FIG. 10, the gripper 5 located at the carry-in/out position 502 holds the rotation support jig 6 corresponding to the kind of workpiece 8 and having the upper jig portion 62 placed on the lower jig portion 61. At this time, the gripper 5 holds the lower jig portion 61.

The turning loader 4 is turned to move the gripper 5 holding the rotation support jig 6 to the delivery/reception position 501. Then, this gripper 5 is moved downward to mount the lower jig portion 61 of the rotation support jig 6 onto the lower support portion 211 on the rotating table 20 of the rotating device 2. Thereafter, the upper support portion 212 on the turning central support column 41 of the turning loader 4 is moved downward to mount the upper jig portion 62 of the rotation support jig 6 onto the upper support portion 212.

Subsequently, the gripper 5 located at the carry-in/out position 502 holds the workpiece 8 corresponding to the rotation support jig 6. Then, the upper support portion 212 on the turning central support column 41 of the turning loader 4 is withdrawn upward. The turning loader 4 is turned to move the gripper 5 holding the workpiece 8 to the delivery/reception position 501.

Thereafter, the gripper 5 holding the workpiece 8 is moved downward to mount the workpiece 8 onto the lower jig portion 61 on the lower support portion 211 on the rotating table 20. Then, the upper support portion 212 and the upper jig portion 62 are moved downward to mount the upper jig portion 62 onto the upper part of the workpiece 8 mounted on the lower jig portion 61. Subsequently, with the workpiece 8 being supported by the lower jig portion 61 and the upper jig portion 62, the rotating table 20 is rotated about the rotation central axis 201.

The cutting tool 7 on the cutting-tool mounting portion 31 whose rotation central axis 301 is tilted with respect to the horizontal direction is moved closer to the workpiece 8, and the cutting-tool mounting portion 31 is rotated about the rotation central axis 301. The rotating cutting tool 7 cuts teeth into the rotating workpiece 8 to form the tooth surfaces 81 in a helical pattern on the outer periphery of the workpiece 8.

After the tooth surfaces 81 are formed in a helical pattern on the outer periphery of the workpiece 8, the cutting-tool mounting portion 31 and the cutting tool 7 are withdrawn, and the upper support portion 212 and the upper jig portion 62 are withdrawn upward. Then, the processed workpiece 8 is held by the gripper 5 located at the delivery/reception position 501, and the turning loader 4 is turned to move this workpiece 8 to the carry-in/out position 502. Simultaneously with this movement, a workpiece 8 before processing is held by the gripper 5 and moved to the delivery/reception position 501. Tooth surfaces 81 are formed on this workpiece 8 before processing in a manner similar to that described above. Subsequently, the operation of carrying the workpiece 8 in, processing the workpiece 8, and carrying the workpiece 8 out is repeated according to the number of workpieces 8 to be processed.

Then, when performing a setup operation to change the kind of workpiece 8 to be processed, the cutting tool 7 and the rotation support jig 6 are replaced before carrying the workpiece 8 to the rotating device 2. As shown in FIGS. 8 and 9, when replacing the cutting tool 7, the cutting-tool mounting portion 31 is moved to place the used cutting tool 7 on the cutting-tool holding portion 72 of the pallet 70 held by the gripper 5 located at the delivery/reception position 501, and this gripper 5 is moved to the carry-in/out position 502 by turning of the turning loader 4. Moreover, a pallet 70 holding a cutting tool 7 to be used next is held by another gripper 5, and this another gripper 5 is moved to the delivery/reception position 501 by turning of the turning loader 4. The cutting tool 7 to be used next is mounted onto the cutting-tool mounting portion 31 in a manner similar to that described above.

As shown in FIG. 10, when replacing the rotation support jig 6, the upper support portion 212 is moved down to separate the upper jig portion 62 from the upper support portion 212 and place the upper jig portion 62 on the lower jig portion 61. Then, the gripper 5 located at the delivery/reception position 501 holds the rotation support jig 6 having the upper jig portion 62 placed on the lower jig portion 61, and the rotation support jig 6 is moved to the carry-in/out position 502 by turning of the turning loader 4. Moreover, a rotation support jig 6 to be used next is held by another gripper 5, and this another gripper 5 is moved to the delivery/reception position 501 by turning of the turning loader 4. The rotation support jig 6 to be used next is mounted onto the workpiece support portion 21 in a manner similar to that described above. Subsequently, the operation of carrying the workpiece 8 in, processing the workpiece 8, and carrying the workpiece 8 out is repeated according to the number of workpieces 8 to be processed.

Thus, according to the rotation processing machine 1 and the rotation processing method described above, the workpiece 8, the rotation support jig 6, and the cutting tool 7 can be delivered and received by using the same turning loader 4. Accordingly, when changing the kind of workpiece 8 to be processed, changeover of the rotation support jig 6 and the cutting tool 7 can be performed in a short time by using the turning loader 4.

The plurality of grippers 5 may be configured to hold any of the workpiece 8, the cutting tool 7, and the rotation support jig 6. Alternatively, each of the plurality of grippers 5 may be configured as a dedicated gripper that holds one of the workpiece 8, the cutting tool 7, and the rotation support jig 6.

The turning loader 4 may be configured to deliver and receive the workpiece 8 and the cutting tool 7, but not the rotation support jig 6. This can reduce the time required for changeover of the cutting tool 7. Alternatively, the turning loader 4 may be configured to deliver and receive the workpiece 8 and the rotation support jig 6, but not the cutting tool 7. This can reduce the time required for changeover of the rotation support jig 6.

Second Embodiment

Figure 11:
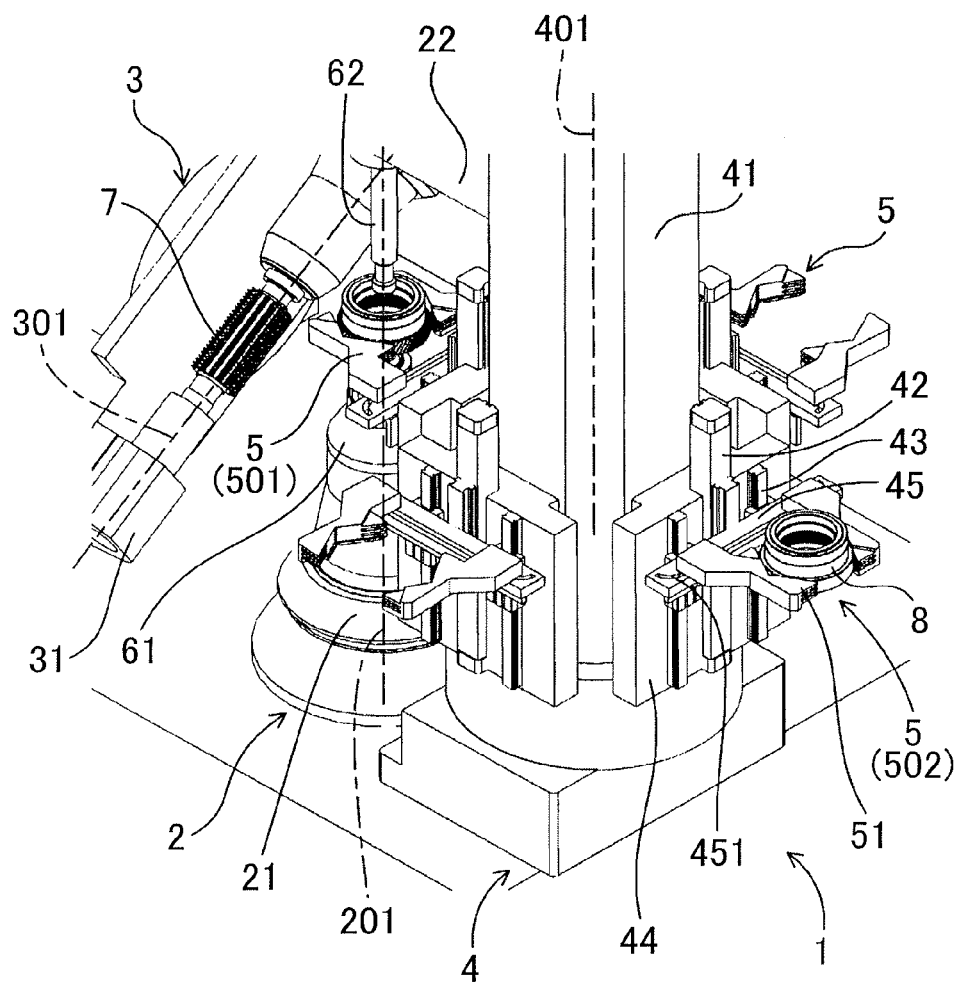
FIG. 11 is a perspective view showing a rotation processing machine according to a second embodiment.
Figure 13:
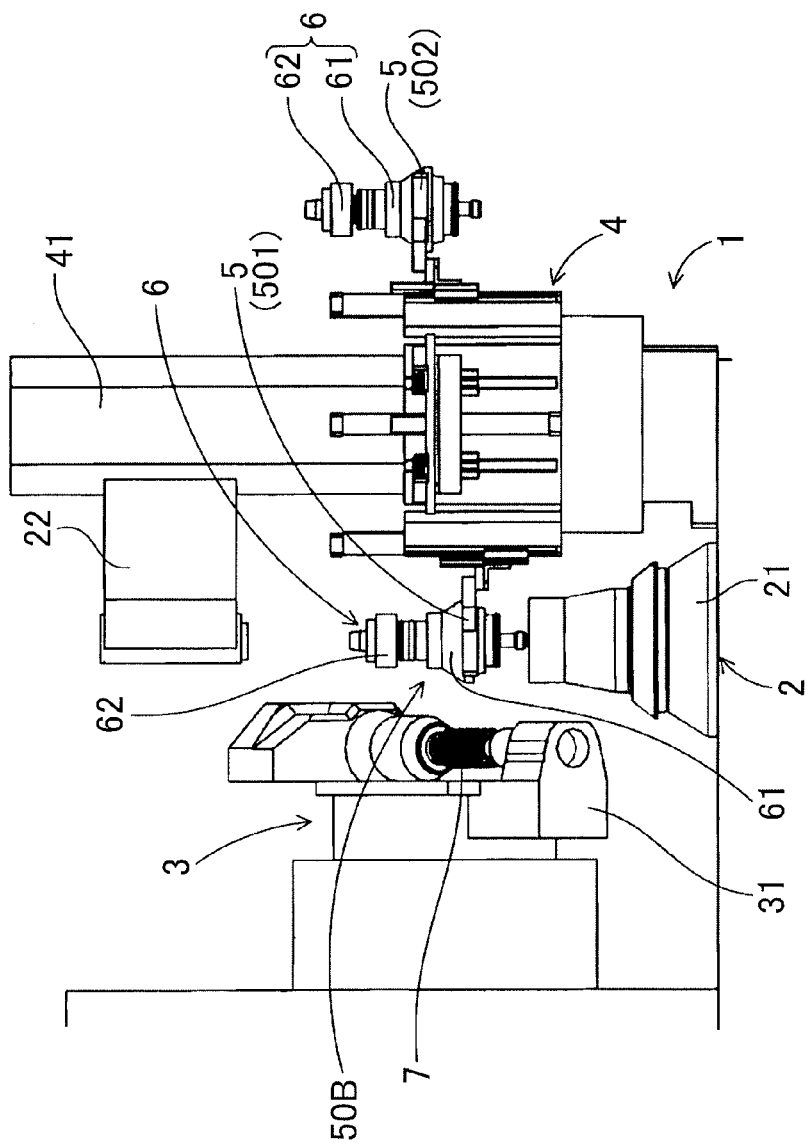
FIG. 13 is a front view showing the rotation processing machine in which the gripper holding a rotation support jig has been set at a second height position and turned from the external delivery/reception position to the internal delivery/reception position according to the second embodiment.
Figure 14:
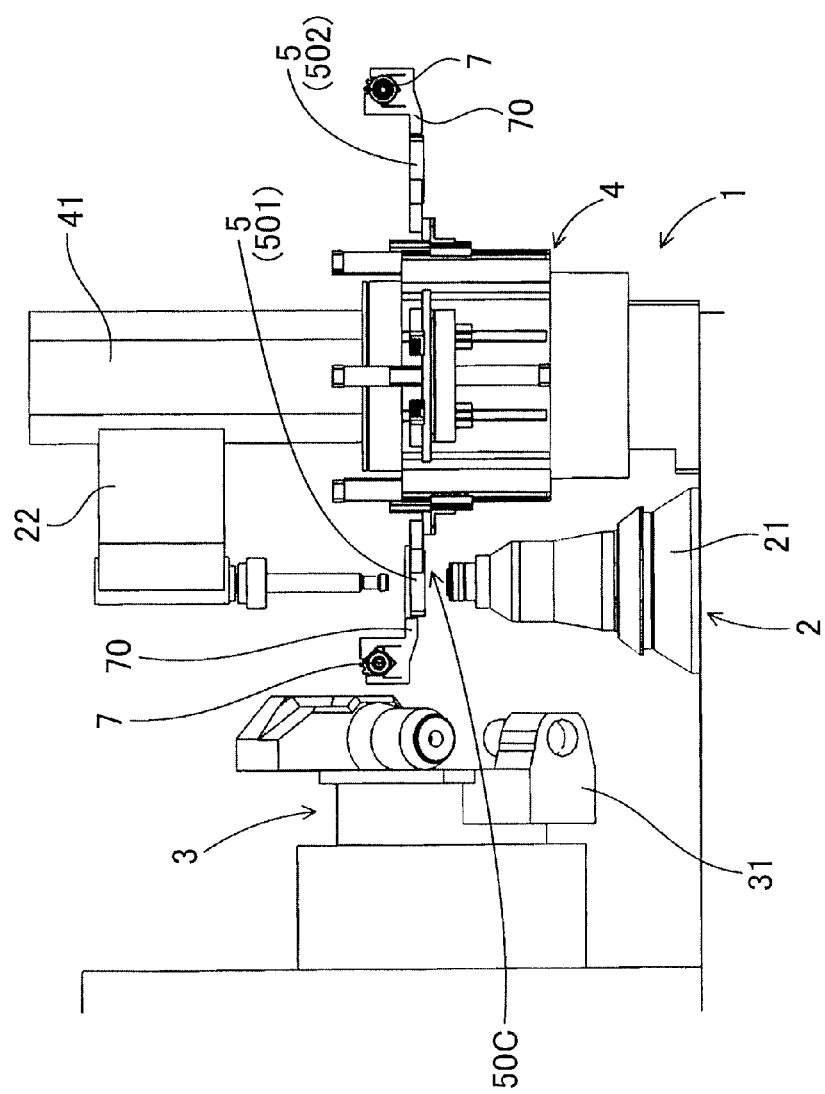
FIG. 14 is a front view showing the rotation processing machine in which the gripper holding a pallet with a cutting tool held thereon has been set at a third height position and turned from the external delivery/reception position to the internal delivery/reception position according to the second embodiment.

As shown in FIG. 11, a rotation processing machine 1 of the present embodiment includes a rotating device 2 that supports a cylindrical workpiece 8 via a rotation support jig 6 and rotates, a processing device 3 on which a cutting tool 7 is mounted to process the cylindrical workpiece 8, and a turning loader 4 that has a plurality of grippers 5 arranged about a turning central axis 401 and that turns so that the plurality of grippers 5 sequentially face the rotating device 2. The plurality of grippers 5 are configured to move up and down independently, and a height position of each of the plurality of grippers 5 can be set to: a first height position 50A where the gripper 5 delivers and receives the cylindrical workpiece 8 to and from the rotating device 2 as shown in FIG. 12; a second height position 50B where the gripper 5 delivers and receives the rotation support jig 6 to and from the rotating device 2 as shown in FIG. 13; and a third height position 50C where the gripper 5 delivers and receives the cutting tool 7 to and from the processing device 3 as shown in FIG. 14.

The turning loader 4 is configured to turn each gripper 5 between an external delivery/reception position 502 where the gripper 5 faces an external transfer stand (not shown) and an internal delivery/reception position 501 where the gripper 5 faces the rotating device 2. The turning loader 4 is configured to set the height position of the gripper 5 to one of the first to third height positions 50A, 50B, 50C at one of the external delivery/reception position 502 and the internal delivery/reception position 501, and to turn the gripper 5 to the other delivery/reception position 501, 502 while holding the gripper 5 at the set height position 50A, 50B, 50C.

The rotation processing machine 1 of the present embodiment will be described in detail below with reference to FIGS. 11 to 15.

Figure 12:
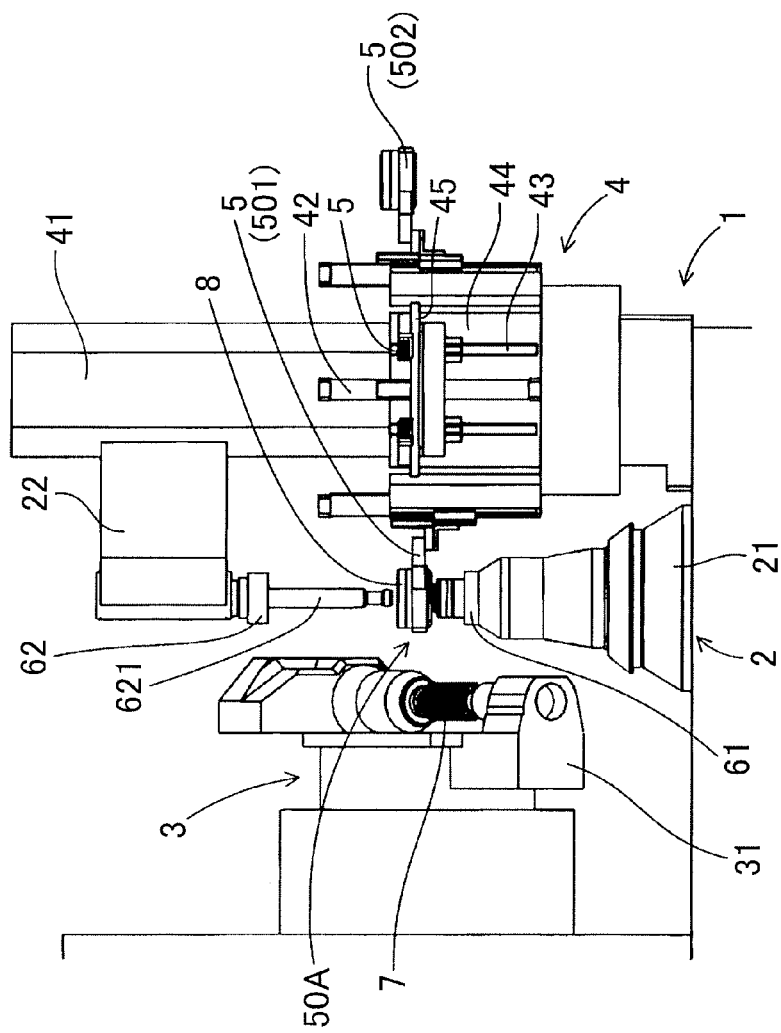
FIG. 12 is a front view showing the rotation processing machine in which a gripper holding a cylindrical workpiece has been set at a first height position and turned from an external delivery/reception position to an internal delivery/reception position according to the second embodiment.

As shown in FIG. 12, the rotating device 2 is configured to rotate one rotating spindle 21 provided on a rotating table by using a rotation drive source, and the other rotating spindle 22 rotates in response to rotation of the one rotating spindle 21. The rotating device 2 of the present embodiment is placed such that its rotation central axis 201 extends in the vertical direction, with the one rotating spindle 21 being on the lower side in the vertical direction and the other rotating spindle 22 being on the upper side in the vertical direction. The other rotating spindle 22 is attached to a turning central support column 41 of the turning loader 4.

The rotation support jig 6 is formed by one jig portion (lower jig portion) 61 that is mounted on the one rotating spindle 21 of the rotating device 2, and the other jig portion (upper jig portion) 62 that is mounted on the other rotating spindle 22 placed coaxially with the one rotating spindle 21 in the rotating device 2. The other jig portion 62 can be carried in combination with the one jig portion 61.

A cylindrical workpiece 8 before processing is carried in by the turning loader 4 to a position between the one jig portion 61 mounted on the one rotating spindle 21 and the other jig portion 62 mounted on the other rotating spindle 22. A processed cylindrical workpiece 8 is carried out by the turning loader 4 from the position between the one jig portion 61 mounted on the one rotating spindle 21 and the other jig portion 62 mounted on the other rotating spindle 22.

As shown in FIG. 11, the turning loader 4 is configured to turn the plurality of grippers 5 by a drive source such as a motor so that each gripper 5 is moved by a predetermined circumferential angle at a time at which the grippers 5 are arranged. Each gripper 5 can individually slide up and down by an electric actuator 42 provided over the turning central support column 41. Linear guides 43 are placed on both sides of the electric actuator 42 over the turning central support column 41. Each gripper 5 can slide up and down along the linear guides 43 in response to the driving force of the electric actuator 42.

The electric actuator 42 and the pair of linear guides 43 are placed on a base plate 44 provided on the turning central support column 41. A cam guide 45 is attached to the electric actuator 42 and the pair of linear guides 43. The cam guide 45 has a guide portion 451 that is used when a pair of gripping portions 51 of the gripper 5 open and close. The guide portion 451 has a linear shape in its central portion where the pair of gripping portions 51 are closed, so that the pair of gripping portions 51 extend parallel to each other. The guide portion 451 is curved toward the turning central support column 41 in its outer portions where the pair of gripping portions 51 are opened.

As shown in FIG. 13, with the other jig portion 62 being placed on and combined with the one jig portion 61, the rotation support jig 6 is transferred (carried) to the rotating device 2 by the turning loader 4. Each of the rotation support jig 6, the cylindrical workpiece 8, and the cutting tool 7 placed on the external transfer stand or a robot is held by the gripper 5 located at the external delivery/reception position 502, and the turning loader 4 is turned to move this gripper 5 to the internal delivery/reception position 501. Thus, each of the rotation support jig 6, the cylindrical workpiece 8, and the cutting tool 7 is transferred to the position facing the rotating device 2.

The rotation support jig 6 is configured so that the one jig portion 61 and the other jig portion 62 are combined together with their respective centers being aligned with each other by inserting a central shaft 621 protruding downward at a center position of the other jig portion 62, into a central hole 611 formed in a center position of the one jig portion 61. A central hole 83 is formed in the center of the cylindrical workpiece 8. When holding the cylindrical workpiece 8 between the one jig portion 61 and the other jig portion 62, the central shaft 621 inserted through the central hole 83 of the cylindrical workpiece 8 is inserted into the central hole 611. The one jig portion 61 and the other jig portion 61 are combined together with the respective centers of the central shaft 621 and the central hole 611 being aligned with each other, regardless of whether the one jig portion 61 and the other jig portion 62 hold the cylindrical workpiece 8 therebetween or not.

The rotation support jig 6 is mounted onto the rotating device 2 as follows.

Figure 15:
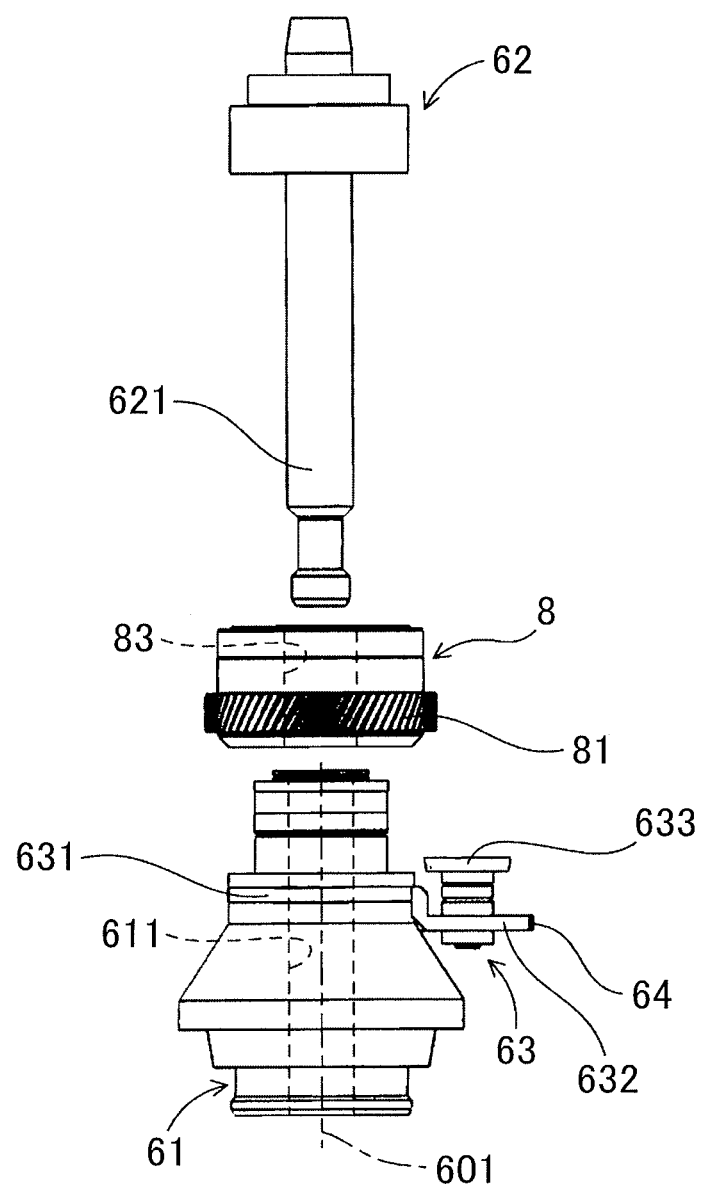
FIG. 15 is a front view showing the rotation support jig formed by one jig portion and the other jig portion according to the second embodiment.

As shown in FIGS. 13 and 15, the gripper 5 located at the external delivery/reception position 502 first holds the rotation support jig 6 placed on the external transfer stand or the robot and having the other jig portion 62 that is placed on the one jig portion 61. Next, the turning loader 4 is turned to move the gripper 5 located at the external delivery/reception position 502 to the internal delivery/reception position 501. Then, the gripper 5 moved to the internal delivery/reception position 501 is moved downward to mount the one jig portion 61 onto the one rotating spindle 21. Thereafter, the other rotating spindle 22 provided on the turning central support column 41 of the turning loader 4 is moved downward to mount the other jig portion 62 onto the other rotating spindle 22. Subsequently, the other rotating spindle 22 is moved upward so that the cylindrical workpiece 8 can be received between the one jig portion 61 and the other jig portion 62.

As shown in FIG. 15, a deburring tool 63 is attached to the one jig portion 61 of the rotation support jig 6. The deburring tool 63 is attached so as to be able to turn about a central axis 601 of the one jig portion 61, and is configured to deburr an end face 80 of the cylindrical workpiece 8 held between the one jig portion 61 and the other jig portion 62.

The deburring tool 63 of the present embodiment has a ring portion 631 that is rotatable about the central axis 601 of the one jig portion 61, a support arm portion 632 provided so as to protrude radially outward of the ring portion 631, and a rotating tool portion 633 that is supported in the support arm portion 632 so as to be rotatable about a central axis parallel to the central axis 601 of the one jig portion 61. The support arm portion 632 is provided with a stopper groove 64 that engages with a retaining member (rod) 65 (see FIG. 6) placed (standing) on a mount of the rotation processing machine 1.

When the one jig portion 61 is mounted onto the one rotating spindle 21, the stopper groove 64 of the support arm portion 632 engages with the retaining member 65 so that the deburring tool 63 does not turn about the central axis 601 of the one jig portion 61 when the one rotating spindle 21 and the one jig portion 61 rotate.

As shown in FIG. 12, the height position of the gripper 5 is changed to the following three height positions when the gripper 5 is moved between the external delivery/reception position 502 and the internal delivery/reception position 501 while holding the cylindrical workpiece 8. That is, the height position of the gripper 5 can be changed to: a height position where the gripper 5 delivers and receives the cylindrical workpiece 8 at the external delivery/reception position 502; a height position where the gripper 5 holds the cylindrical workpiece 8 and is turned by the turning loader 4; and a height position where the gripper 5 delivers and receives the cylindrical workpiece 8 at the internal delivery/reception position 501. The height position where the gripper 5 holds the cylindrical workpiece 8 and is turned by the turning loader 4 is the first height position 50A where the gripper 5 delivers and receives the cylindrical workpiece 8 to and from the rotating device 2. The first height position 50A is set as a height position where the cylindrical workpiece 8 held by the gripper 5 is located slightly higher than the one jig portion 61 on the rotating device 2.

As shown in FIG. 13, the height position of the gripper 5 is changed to the following three height positions when the gripper 5 is moved between the external delivery/reception position 502 and the internal delivery/reception position 501 while holding the rotation support jig 6. That is, the height position of the gripper 5 can be changed to: a height position where the gripper 5 delivers and receives the rotation support jig 6 at the external delivery/reception position 502; a height position where the gripper 5 holds the rotation support jig 6 and is turned by the turning loader 4; and a height position where the gripper 5 delivers and receives the rotation support jig 6 at the internal delivery/reception position 501. The height position where the gripper 5 holds the rotation support jig 6 and is turned by the turning loader 4 is the second height position 50B where the gripper 5 delivers and receives the rotation support jig 6 to and from the rotating device 2. The second height position 50B is set as a height position where the rotation support jig 6 held by the gripper 5 is located slightly higher than the one rotating spindle 21 of the rotating device 2.

As shown in FIG. 14, the height position of the gripper 5 is changed to the following three height positions when the gripper 5 is moved between the external delivery/reception position 502 and the internal delivery/reception position 501 while holding a pallet 70 with the cutting tool 7 being held thereon. That is, the height position of the gripper 5 can be changed to: a height position where the gripper 5 delivers and receives the pallet 70 at the external delivery/reception position 502; a height position where the gripper 5 holds the pallet 70 and is turned by the turning loader 4; and a height position where the gripper 5 delivers and receives the cutting tool 7 held on the pallet 70 to and from a cutting-tool mounting portion 31 of the processing device 3 at the internal delivery/reception position 501. The height position where the gripper 5 holds the pallet 70 and is turned by the turning loader 4 is the third height position 50C where the gripper 5 delivers and receives the cutting tool 7 to and from the processing device 3. The third height position 50C is set as a height position where the pallet 70 held by the gripper 5 is located slightly higher than the one jig portion 61 on the rotating device 2.

Operation of the rotation processing machine 1 of the present embodiment will be described below.

As shown in FIG. 14, when processing the cylindrical workpiece 8, the pallet 70 holding the cutting tool 7 corresponding to the kind of cylindrical workpiece 8 is held by the gripper 5 at the external delivery/reception position 502, and the height position of this gripper 5 is set to the third height position 50C where the gripper 5 delivers and receives the cutting tool 7. The third height position 50C is set to such a height that the gripper 5 and the pallet 70 do not interfere with the one jig portion 61 on the one rotating spindle 21 of the rotating device 2 and the other jig portion 62 on the other rotating spindle 22 when the turning loader 4 is turned. With the gripper 5 being held at the third height position 50C, the turning loader 4 is turned to move the cutting tool 7 on the pallet 70 held by the gripper 5 from the external delivery/reception position 502 to the internal delivery/reception position 501 so that the cutting tool 7 faces the rotating device 2 and the processing device 3. Then, the cutting-tool mounting portion 31 of the processing device 3 is moved and the cutting tool 7 held by the gripper 5 is mounted onto the cutting-tool mounting portion 31.

As shown in FIG. 13, the rotation support jig 6 corresponding to the kind of cylindrical workpiece 8 is held by the gripper 5 at the external delivery/reception position 502, and the height position of this gripper 5 is set to the second height position 50B where the gripper 5 delivers and receives the rotation support jig 6. The second height position 50B is set to such a height that the gripper 5 and the rotation support jig 6 do not interfere with the one rotating spindle 21 of the rotating device 2 when the turning loader 4 is turned. With the gripper 5 being held at the second height position 50B, the turning loader 4 is turned to move the rotation support jig 6 held by the gripper 5 from the external delivery/reception position 502 to the internal delivery/reception position 501 so that the rotation support jig 6 faces the rotating device 2. The gripper 5 is moved downward to mount the one jig portion 61 of the rotation support jig 6 held by the gripper 5 onto the one rotating spindle 21 of the rotating device 2.

The other rotating spindle 22 on the turning central support column 41 is moved downward to mount the other rotating spindle 22 onto the other jig portion 62 combined with the one jig portion 61. Then, the other rotating spindle 22 is moved upward and withdrawn.

As shown in FIG. 12, a cylindrical workpiece 8 before processing is held by the gripper 5 at the external delivery/reception position 502, and the height position of this gripper 5 is set to the first height position 50A where the gripper 5 delivers and receives the cylindrical workpiece 8. The first height position 50A is set to such a height that the gripper 5 and the cylindrical workpiece 8 do not interfere with the one jig portion 61 on the one rotating spindle 21 of the rotating device 2 when the turning loader 4 is turned. The other jig portion 62 on the other rotating spindle 22 of the rotating device 2 is withdrawn to such a position that the other jig portion 62 does not interfere with the cylindrical workpiece 8. With the gripper 5 being held at the first height position 50A, the turning loader 4 is turned to move the cylindrical workpiece 8 held by the gripper 5 from the external delivery/reception position 502 to the internal delivery/reception position 501 so that the cylindrical workpiece 8 faces the rotating device 2.

The gripper 5 is moved downward to mount the cylindrical workpiece 8 onto the one jig portion 61 mounted on the one rotating spindle 21 of the rotating device 2. The other rotating spindle 22 of the rotating device 2 is moved downward to insert the central shaft 621 of the other jig portion 62 mounted on the other rotating spindle 22 into the central hole 83 of the cylindrical workpiece 8 and the central hole 611 of the one jig portion 61 mounted on the one rotating spindle 21 (see FIG. 15).

In this manner, the cylindrical workpiece 8 is carried in, and is held between the one jig portion 61 and the other jig portion 62 so that the cylindrical workpiece 8 can be rotated by the rotating device 2.

Then, the cutting tool 7 on the processing device 3 is rotated to cut tooth surfaces 81 on the outer periphery of the cylindrical workpiece 8 rotated by the rotating device 2. Thereafter, the other rotating spindle 22 and the other jig portion 62 are withdrawn upward, the processed cylindrical workpiece 8 mounted on the one jig portion 61 on the one rotating spindle 21 is held by the gripper 5 located at the internal delivery/reception position 501, and the turning loader 4 is turned to move this gripper 5 to the external delivery/reception position 502, thereby carrying the cylindrical workpiece 8 out. Subsequently, the operation of carrying the cylindrical workpiece 8 in, processing the cylindrical workpiece 8, and carrying the cylindrical workpiece 8 out is repeated according to the number of cylindrical workpieces 8 to be processed.

If changeover of the rotation support jig 6 or the cutting tool 7 is needed according to the kind of cylindrical workpiece 8 to be processed, the turning loader 4 is turned so that the gripper 5 holding the rotation support jig 6 or the cutting tool 7 moves between the internal delivery/reception position 501 and the external delivery/reception position 502 while being held at the second height position 50B or the third height position 50C in a manner similar to that described above.

As described above, in the rotation processing machine 1, the height position of the gripper 5 on the turning loader 4 can be changed to the three height positions, namely, the height position where the gripper 5 delivers and receives the cylindrical workpiece 8, the height position where the gripper 5 delivers and receives the rotation support jig 6, and the height position where the gripper 5 delivers and receives the cutting tool 7. This can reduce the time required to move the gripper 5 of the turning loader 4 up and down when delivering and receiving the cylindrical workpiece 8, the rotation support jig 6, and the cutting tool 7, and thus can reduce the time required for transfer of the cylindrical workpiece 8 and for changeover of the rotation support jig 6 and the cutting tool 7.

In the rotation processing machine 1, the cylindrical workpiece 8, the rotation support jig 6, and the cutting tool 7 can be delivered and received by using the same turning loader 4. This can also reduce the time required for changeover of the rotation support jig 6 and the cutting tool 7.

What is claimed is:

1. A rotation processing machine, comprising:
   a rotating device that holds a workpiece and rotates;
   a processing device on which a cutting tool is mounted to process the workpiece; and
   a turning loader that has a plurality of grippers arranged about a turning central axis, and that turns so that the plurality of grippers sequentially face the rotating device, wherein
   the turning loader is configured to deliver and receive the workpiece to and from the rotating device by turning with the workpiece being directly or indirectly held by a gripper of the plurality of grippers, and to deliver and receive the cutting tool to and from the processing device by turning with the cutting tool being directly or indirectly held by the gripper of the plurality of grippers,
   the rotating device is configured to rotate about a rotation central axis extending in a first direction,
   the turning loader is configured to turn each of the plurality of grippers in a second direction perpendicular to the turning central axis, wherein the turning central axis is parallel to the rotation central axis, and
   each of the plurality of grippers is capable of individually moving relatively with respect to both the rotating device and the processing device in the first direction, and are configured to make the relative movement to deliver and receive the workpiece between the turning loader and the rotating device and to deliver and receive the cutting tool between the turning loader and the processing device,
   wherein each of the plurality of grippers of the turning loader include a respective pair of gripping portions and are configured to individually vary, in a direction perpendicular to the turning central axis, an interval between the gripping portions of the respective pair of gripping portions.

2. The rotation processing machine according to claim 1, wherein
   the workpiece has a cylindrical shape, and
   the processing device is configured so that both ends of the cutting tool are mounted on a cutting-tool mounting portion of the processing device, and is configured to rotate the cutting tool on the cutting-tool mounting portion to form a tooth surface on an outer periphery of the workpiece rotated by the rotating device.

3. The rotation processing machine according to claim 2, wherein
   the rotation central axis extends in a vertical direction,
   the second direction is a horizontal direction, and
   the turning central axis extends in the vertical direction.

4. The rotation processing machine according to claim 3, wherein
   the cutting tool is configured to be held by a pallet, and the pallet has a base portion that is held by the gripper of the plurality of grippers, and the pallet has a cutting-tool holding portion that is formed at a position offset from a center of the base portion and that holds the cutting tool, and
   the processing device is configured so that a cutting-tool mounting portion is advanced, and so that the cutting tool on the cutting-tool holding portion of the pallet held by the gripper of the plurality of grippers is mounted on the cutting-tool mounting portion that has been advanced.

5. The rotation processing machine according to claim 4, wherein the rotating device is configured to support the workpiece via a rotation support jig mounted on a workpiece support portion of the rotating device, and
   the turning loader is configured to deliver and receive the rotation support jig to and from the rotating device by turning with the rotation support jig being directly or indirectly held by the gripper of the plurality of grippers.

6. The rotation processing machine according to claim 3, wherein
   the rotating device is configured to support the workpiece via a rotation support jig mounted on a workpiece support portion of the rotating device, and
   the turning loader is configured to deliver and receive the rotation support jig to and from the rotating device by turning with the rotation support jig being directly or indirectly held by the gripper of the plurality of grippers.

7. The rotation processing machine according to claim 2, wherein
the cutting tool is configured to be held by a pallet, and the pallet has a base portion that is held by the gripper of the plurality of grippers, and the pallet has a cutting-tool holding portion that is formed at a position offset from a center of the base portion and that holds the cutting tool, and
the processing device is configured so that the cutting-tool mounting portion is advanced, and so that the cutting tool on the cutting-tool holding portion of the pallet held by the gripper of the plurality of grippers is mounted on the cutting-tool mounting portion that has been advanced.

8. The rotation processing machine according to claim 7, wherein
the rotating device is configured to support the workpiece via a rotation support jig mounted on a workpiece support portion of the rotating device, and
the turning loader is configured to deliver and receive the rotation support jig to and from the rotating device by turning with the rotation support jig being directly or indirectly held by the gripper of the plurality of grippers.

9. The rotation processing machine according to claim 2, wherein
the rotating device is configured to support the workpiece via a rotation support jig mounted on a workpiece support portion of the rotating device, and
the turning loader is configured to deliver and receive the rotation support jig to and from the rotating device by turning with the rotation support jig being directly or indirectly held by the gripper of the plurality of grippers.

10. The rotation processing machine according to claim 1, wherein
the cutting tool is configured to be held by a pallet, and the pallet has a base portion that is held by the gripper of the plurality of grippers, and the pallet has a cutting-tool holding portion that is formed at a position offset from a center of the base portion and that holds the cutting tool, and
the processing device is configured so that a cutting-tool mounting portion is advanced, and so that the cutting tool on the cutting-tool holding portion of the pallet held by the gripper of the plurality of grippers is mounted on the cutting-tool mounting portion that has been advanced.

11. The rotation processing machine according to claim 10, wherein
the rotating device is configured to support the workpiece via a rotation support jig mounted on a workpiece support portion of the rotating device, and
the turning loader is configured to deliver and receive the rotation support jig to and from the rotating device by turning with the rotation support jig being directly or indirectly held by the gripper of the plurality of grippers.

12. The rotation processing machine according to claim 1, wherein
the rotating device is configured to support the workpiece via a rotation support jig mounted on a workpiece support portion of the rotating device, and
the turning loader is configured to deliver and receive the rotation support jig to and from the rotating device by turning, with the rotation support jig being directly or indirectly held by the gripper of the plurality of grippers.

13. The rotation processing machine according to claim 12, wherein the rotation support jig is formed by one jig portion that is mounted on one rotating spindle of the rotating device, and an other jig portion that is mounted on an other rotating spindle placed coaxially with the one rotating spindle in the rotating device, and
the turning loader is configured to allow the gripper of the plurality of grippers to hold the rotation support jig having the one jig portion combined with the other jig portion.

14. The rotation processing machine according to claim 13, wherein
a deburring tool is rotatably attached to the rotation support jig, and
the deburring tool is configured to remove burrs generated in the workpiece when the workpiece is processed by the processing device.

15. A rotation processing machine, comprising:
a rotating device that holds a workpiece and rotates;
a processing device on which a cutting tool is mounted to process the workpiece; and
a turning loader that has a plurality of grippers arranged about a turning central axis, and that turns so that the plurality of grippers sequentially face the rotating device, wherein
the turning loader is configured to deliver and receive the workpiece to and from the rotating device by turning with the workpiece being held by a gripper of the plurality of grippers, and to deliver and receive the cutting tool to and from the processing device by turning with the cutting tool being held by the gripper of the plurality of grippers,
the cutting tool is configured to be held by a pallet, and the pallet has a base portion that is held by the gripper of the plurality of grippers, and the pallet has a cutting-tool holding portion that is formed at a position offset from a center of the base portion and that holds the cutting tool, and
the processing device is configured so that a cutting-tool mounting portion is advanced, and so that the cutting tool on the cutting-tool holding portion of the pallet held by the gripper of the plurality of grippers is mounted on the cutting-tool mounting portion that has been advanced.

16. The rotation processing machine according to claim 15, wherein
the rotating device is configured to support the workpiece via a rotation support jig mounted on a workpiece support portion of the rotating device, and
the turning loader is configured to deliver and receive the rotation support jig to and from the rotating device by turning with the rotation support jig being directly or indirectly held by the gripper of the plurality of grippers.

17. A rotation processing machine, comprising:
a rotating device that holds a workpiece and rotates;
a processing device on which a cutting tool is mounted to process the workpiece; and
a turning loader that has a plurality of grippers arranged about a turning central axis, and that turns so that the plurality of grippers sequentially face the rotating device, wherein:

the turning loader is configured to deliver and receive the workpiece to and from the rotating device by turning with the workpiece being held by a gripper of the plurality of grippers, and to deliver and receive the cutting tool to and from the processing device by turning with the cutting tool being held by the gripper of the plurality of grippers, the rotating device is configured to support the workpiece via a rotation support jig mounted on a workpiece support portion of the rotating device, and the turning loader is configured to deliver and receive the rotation support jig to and from the rotating device by turning with the rotation support jig being directly or indirectly held by the gripper of the plurality of grippers, the rotation support jig is formed by one jig portion that is mounted on one rotating spindle of the rotating device, and an other jig portion that is mounted on an other rotating spindle placed coaxially with the one rotating spindle in the rotating device, the turning loader is configured to allow the gripper of the plurality of grippers to hold the rotation support jig having the one jig portion combined with the other jig portion, a deburring tool is rotatably attached to the rotation support jig, and the deburring tool is configured to remove burrs generated in the workpiece when the workpiece is processed by the processing device.

* * * * *